United States Patent [19]
Flagge

[11] 3,849,720
[45] Nov. 19, 1974

[54] ELECTRO-MECHANICAL SINE/COSINE GENERATOR

[76] Inventor: Bruce Flagge, 107 Dogwood Court Dr., Yorktown, Va. 23490

[22] Filed: Mar. 13, 1973

[21] Appl. No.: 340,862

Related U.S. Application Data

[63] Continuation-in-part of Ser. No. 229,143, Feb. 24, 1972, abandoned.

[52] U.S. Cl. .................... 322/96, 310/111, 310/168
[51] Int. Cl. .......................................... H02k 39/00
[58] Field of Search .......... 310/111, 168, 171, 155, 310/159; 322/96, 47, 97

[56] References Cited
UNITED STATES PATENTS

| | | | |
|---|---|---|---|
| 2,325,927 | 8/1943 | Wilbur | 310/111 UX |
| 2,541,422 | 2/1951 | Kirkland et al. | 310/168 UX |
| 2,671,882 | 3/1954 | Page | 322/96 X |
| 2,738,433 | 3/1956 | Schroeder et al. | 310/171 |
| 2,832,905 | 4/1958 | Clay | 310/111 X |
| 2,917,699 | 12/1959 | Grant | 322/96 X |
| 3,030,533 | 4/1962 | Schugt | 310/111 X |
| 3,267,399 | 8/1966 | Spieker et al. | 310/168 X |

Primary Examiner—D. F. Duggan
Attorney, Agent, or Firm—William H. King; Howard J. Osborn; John R. Manning

[57] ABSTRACT

An electro-mechanical device for generating both sine and cosine functions. A motor rotates a cylinder about an axis parallel to and a slight distance from the central axis of the cylinder. Two noncontacting displacement sensing devices are placed ninety degrees apart, equal distances from the axis of rotation of the cylinder and short distances above the surface of cylinder. Each of these sensing devices produces an electrical signal proportional to the distance that it is away from the cylinder. Consequently, as the cylinder is rotated the outputs from the two sensing devices are the sine and cosine functions.

1 Claim, 4 Drawing Figures

PATENTED NOV 19 1974     3,849,720

ELECTRO-MECHANICAL SINE/COSINE GENERATOR

This is a continuation-in-part of application Ser. No. 229,143, filed Feb. 24, 1972, now abandoned.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to function generators and more specifically concerns an electro-mechanical device that generates sine and cosine functions.

In the past, sine and cosine functions have been generated primarily by sine-cosine potentiometers. These potentiometers have sliding contacts that limit their useful life to about a million revolutions which is approximately twenty hours of operating time. Hence, these potentiometers have to be replaced often. Each time a potentiometer is replqced there is not only the large expense of the replacement potentiometer, but also several hours are required to install the replacement. It is therefore the primary object of this invention to provide a sine/cosine function generator that has no sliding contacts thereby resulting in a generator that has a longer life expectancy than prior art generators. Another object of this invention is to provide a bushless sine-cosine function generator which will make it useful for operation at speeds higher than have been possible in the past.

SUMMARY OF THE INVENTION

Referring to FIG. 1, the principle of operation of this invention is described. The letter A designated an end view of a cylinder having a center C and a radius R. Cylinder A is located near the corner of two planes M and N that make an angle of 90° with each other where they intersect. The distance from cylinder A to plane M is V and the distance from cylinder A to plane N is H. If cylinder A is rotated about a point P that is a distance $r$ from center C and a distance D from both planes M and N, the center C will define a circle E having a center P, and a radius $r$. As can be seen from FIG. 1, when center C rotates through an angle $\theta$ about point P, the distances H and V are given by the following equations:

$H = D - R - r \cos \theta$
$V = D - R - r \sin \theta$

Therefore, if the distances H and V are measured as cylinder A is rotated about point P, these measurements will be related to the cosine and sine functions, respectively.

To utilize the above principle of operation a motor is coupled to a cylinder to rotate the cylinder about an axis that is parallel to and about 0.02 inches from the central axis of the cylinder. Two non-contacting displacement sensing devices are placed above the surface of the cylinders equal distances from the axis of rotation of the cylinder, and 90° apart around the cylinder. Each of these displacement sensing devices produces an electrical signal having an amplitude proportional to the distance between it and the surface of the cylinder. Consequently, as the cylinder is rotated the two displacement sensing devices produce electrical signals that are the sine and cosine functions. The signals produced by the displacement sensing devices are processed by operational amplifiers to give the proper zero and peak amplitudes to the signals.

DETAILED DESCRIPTION OF THE INVENTION

Figure 2:
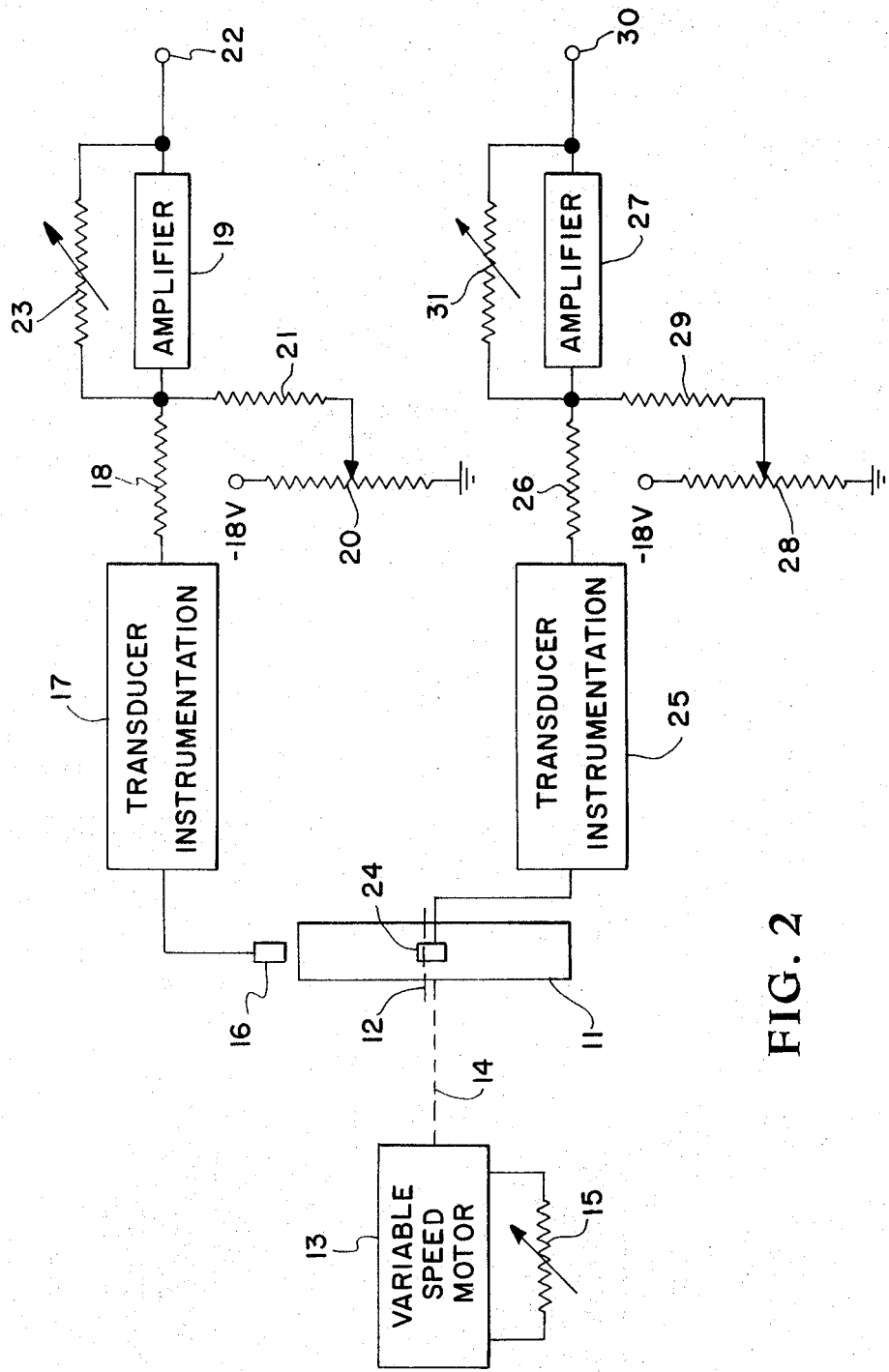
FIG. 2 is a block diagram of the invention.

Turning now to the embodiment of the invention selected for illustration in the drawings, the number 11 in FIG. 2 designates a cylinder having a central axis 12. A variable speed motor 13 is coupled to cylinder 11 by a coupling means 14 to rotate the cylinder about an axis parallel to and about 0.02 inches from axis 12. Motor 13 includes a field winding 15 that can be varied to change the speed of motor 13. A noncontacting displacement sensing device including a sensing element 16 and transducer instrumentation 17 has sensing element 16 placed above the surface of cylinder 11. Sensing element 16 is electrically connected to transducer instrumentation 17 which produces an electrical signal having an amplitude proportional to the distance between sensing element 16 and cylinder 11. This electrical signal is applied through an isolation resistor 18 to the input of an operational amplifier 19. The slider of a potentiometer 20 having a negative 18 volts applied to it is connected through a resistor 21 to the input to said amplifier 19. The output terminal 22 of amplifier 19 is connected through a variable gain resistor 23 to the input to amplifier 19. The proper zero and peak amplitude at output terminal 22 are adjusted by the slider of potentiometer 20 and the variable gain resistor 23. The signal at output terminal 22 is a sine wave having a frequency proportional to the speed of motor 13.

A second noncontacting displacement sensing device including a sensing element 24 and transducer instrumentation 25 has its sensing element 24 placed above the surface of cylinder 11 at a point ninety degrees around cylinder 11 from sensing element 16. Sensing element 24 is also placed such that it is the same distance from the axis of rotation of cylinder 11. Sensing element 24 is electrically connected to transducer instrumentation 25 which produces an electrical signal having an amplitude proportional to the distance between sensing element 24 and cylinder 11. This electrical signal is applied through an isolation resistor 26 to the input of an operational amplifier 27. The slider of a potentiometer 28 having a negative 18 volts applied to it is connected through a resistor 29 tO the input to said amplifier 27. The output terminal 30 of amplifier 27 is connected through a variable gain resistor 31 to the input to amplifier 27. The proper zero and peak amplitude are adjusted by the slider of potentiometer 28 and the variable gain resistor 31. The signal at output terminal 30 is also a sine wave having a frequency proportional to the speed of motor 13. Assuming motor 13 is rotating cylinder 11 in a clockwise direction, then the sine wave at output terminal 22 lags the sine wave at output terminal 30; hence, the signal at output terminal 30 is a sine wave and the signal at output terminal 22 is a cosine wave. The frequency of the signals at output terminals 22 and 30 can be varied by adjusting the field winding 15 of motor 13.

The noncontacting displacement sensing elements 16 and 24 and transducer instrumentation 17 and 25 are the eddy current type which are commercially available from Kaman Sciences Corporation, Colorado Springs, Colorado, as a noncontacting displacement transducer KD-1100 series. The cylinder 11 is made from stainless steel. The cylinder can be made from any other electrical conductive material. There are many other commercially available noncontacting displacement transducers that can be used with this invention. The type of displacement transducer used determines the composition of cylinder 11. For example, if the noncontacting displacement transducer is the magnetic type, then it is necessary that the composition of the cylinder be a magnetic material; or if the transducer is the photoelectric type or forced-air type, then the composition of the cylinder can be any material as long as it retains its shape as it is being rotated.

Figure 1:
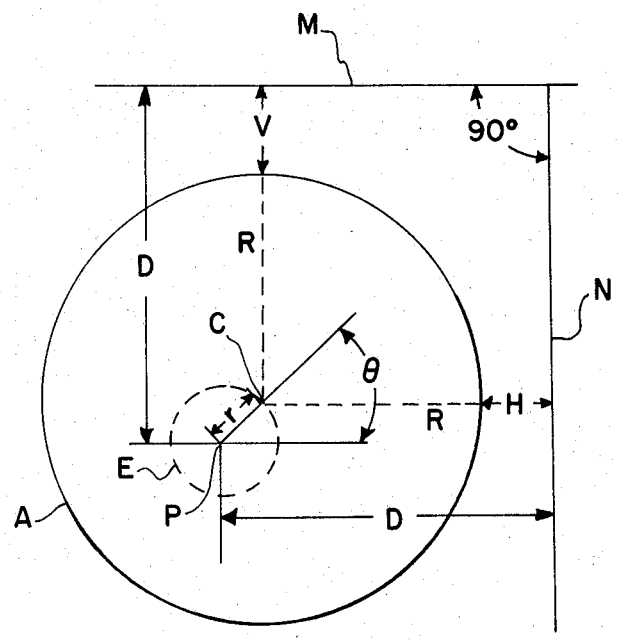
FIG. 1 is a schematic drawing for the purpose of describing the principle of operation of the invention.
Figures 3A, 3B:
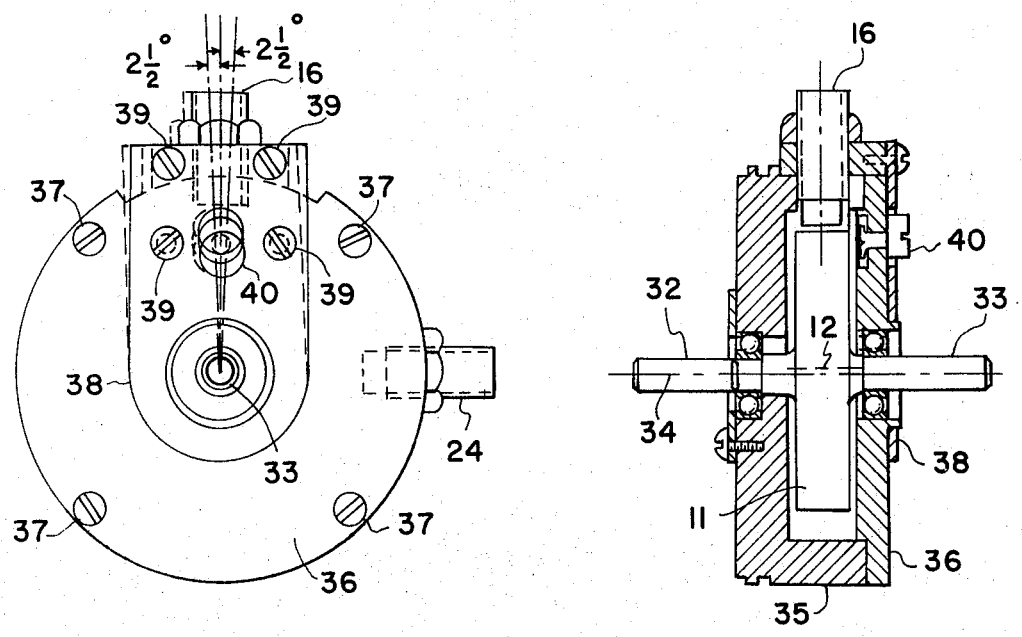
FIGS. 3a and 3b are a front and a side cutaway view, respectively, of the means for positioning the cylinder and sensing means of this invention relative to each other.

In FIGS. 3a and 3b there is shown means for spacing sensing elements 16 and 24 and cylinder 11 relative to each other. cylinder 11 has shafts 32 and 33 attached to it such that their centerline 34 is parallel to and a short distance from the central axis 12 of cylinder 11. Support piece 35 supports shaft 32 so that it is free to rotate and support piece 36 supports shaft 33 so that it is free to rotate. Support pieces 35 and 36 are attached together by screws 37 such that sensing elements 16 and 24 are supported thereby and equidistant from axis of rotation 34. A piece 38 also aids in the support of sensing element 15. By means of an adjusting screw 40 the angular position of sensing element 15 can be adjusted so that there is exactly ninety degrees between sensing element 15 and sensing element 24. Screws 39 hold piece 38 in a fixed position relative to support piece 36.

The advantages of this invention are that is provides a simple, inexpensive sine-cosine function generator that has a longer life expectancy than prior art sine-cosine function generators. It has excellent dynamic characteristics and will replace sine-cosine potentiometers when long life and uninterrupted operation is important. Its only wearing parts are ball bearings which may be easily replaced. Because it is brushless, the invention will be useful for operation at speeds higher than have been possible in the past.

It is to be understood that the form of the invention herewith shown and described is to be taken as a preferred embodiment. Various changes may be made without departing from the spirit and scope of the invention as defined in the subjoined claims. For example, different noncontacting displacement sensing devices and different means for adjusting the angular distance between the two sensing devices can be used without departing from this invention.

What is claimed is:

1. A function generator comprising:

A cylinder having an axis of rotation parallel to and a distance from its central axis;

a noncontacting transducer means including a sensing element, with said sensing element located from the surface of said cylinder and fixed relative to said axis of rotation; for producing an electrical signal proportional to the distance between said sensing element and the surface of said cylinder;

means for adjusting the zero and peak amplitudes of said electrical signal produced by said noncontacting means; and means for rotating said cylinder about said axis of rotation whereby the electrical signal produced by said noncontacting transducer means as said cylinder rotates is a sine function.

* * * * *